Nov. 24, 1953  M. F. MALONEY  2,660,266
DEVICE FOR ALTERNATINGLY INTERRUPTING THE
BRAKE FLUID PRESSURE IN BRAKE LINES
Filed July 17, 1952  2 Sheets-Sheet 2
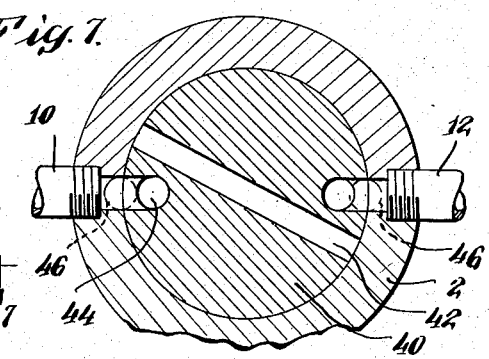
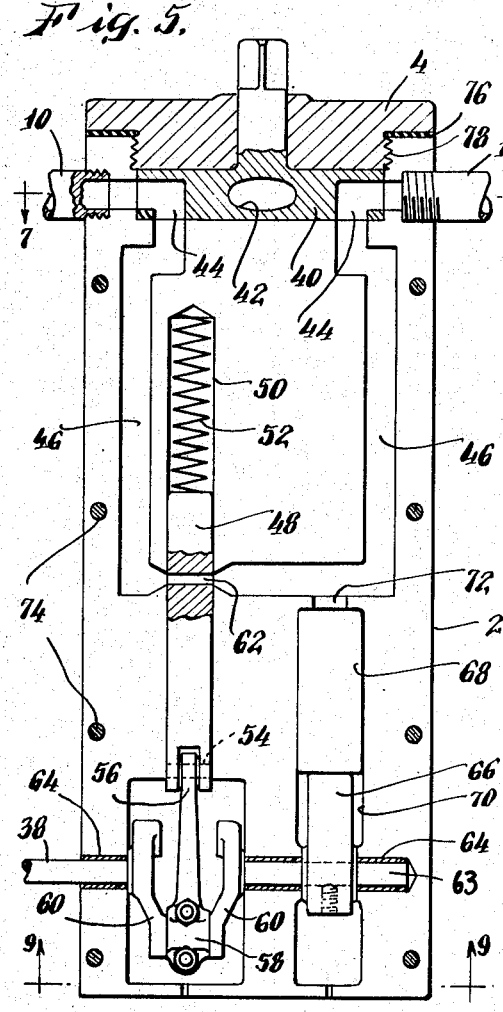
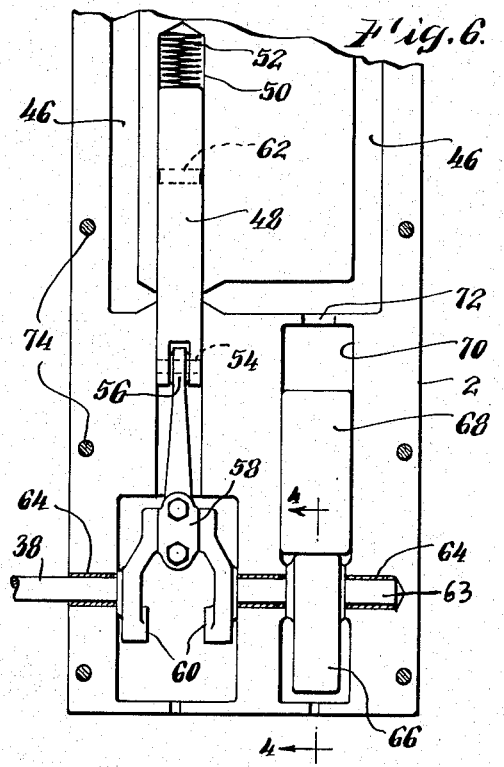
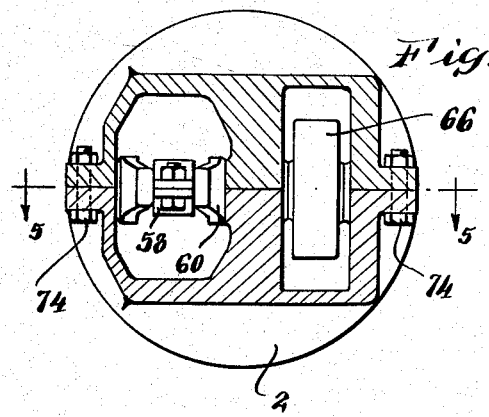
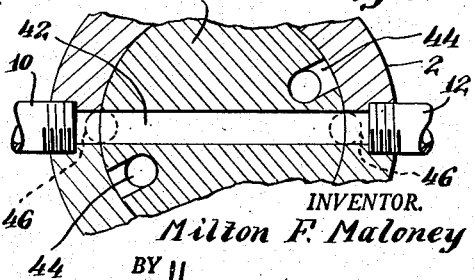
INVENTOR.
Milton F. Maloney
BY
ATTORNEY.

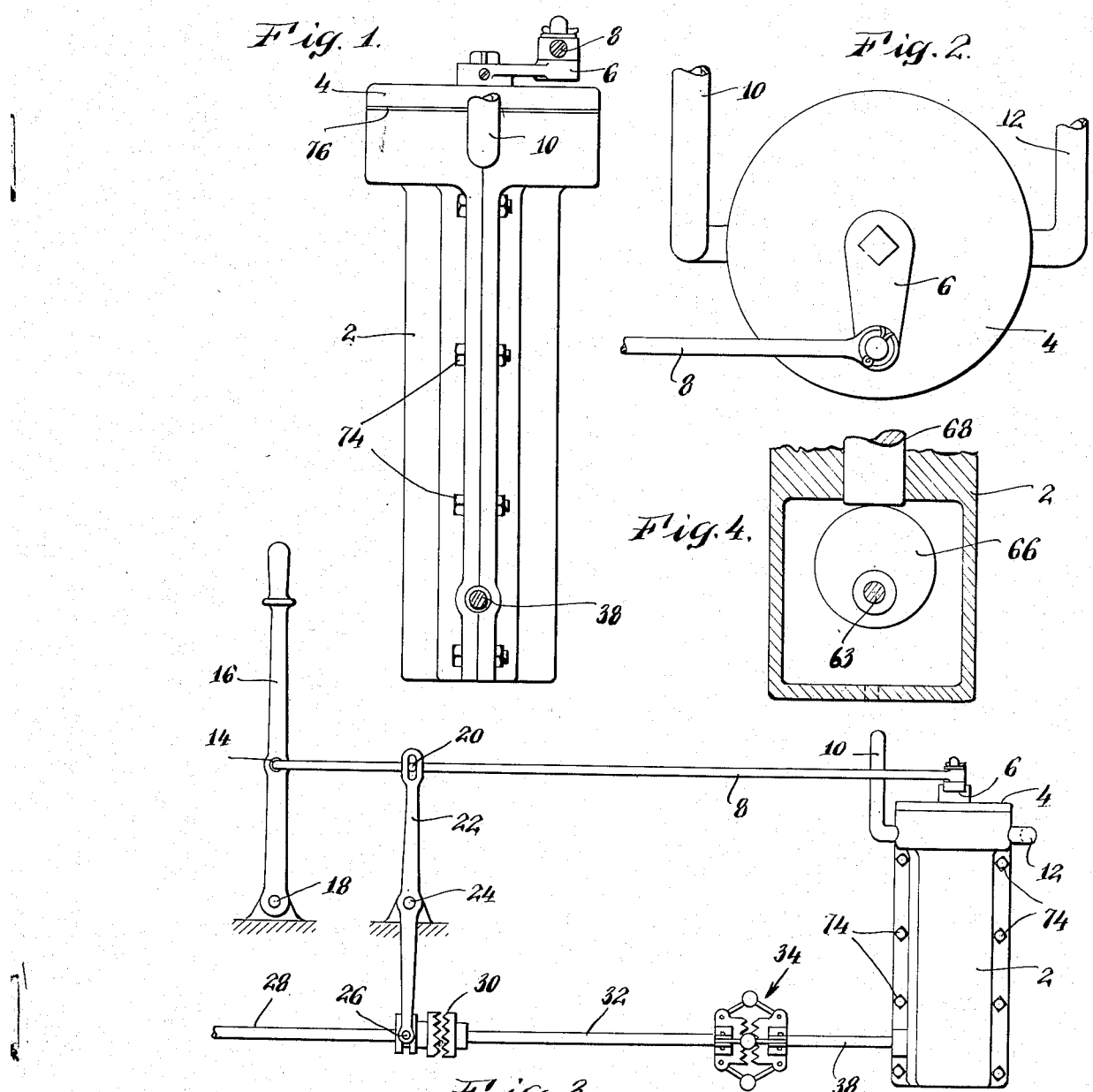

Patented Nov. 24, 1953

2,660,266

UNITED STATES PATENT OFFICE 2,660,266

DEVICE FOR ALTERNATINGLY INTERRUPTING THE BRAKE FLUID PRESSURE IN BRAKE LINES

Milton F. Maloney, Fairhaven, N. J.

Application July 17, 1952, Serial No. 299,381

4 Claims. (Cl. 188—152)

This invention relates generally to fluid pressure applying mechanism and refers more particularly to improvements in hydraulic mechanism for wheel brakes.

It is well-known that friction is greater when surfaces are motionless in relation to each other (static friction) than after they start to slide (sliding friction). Thus a passenger car, truck, bus, or any other vehicle may get out of the driver's control if the brakes are applied on icy, snowy or wet, slippery roads because the friction between road surface and tires is reduced to such an extent that the application of the brakes locks the wheels, causing a sliding of the vehicle on the slippery surface.

Therefore, one object of the present invention is the provision of a device of the character described which will alternatingly interrupt automatically the pressure of the brake fluid in a vehicle's brake lines, so that the brake pressure is rapidly applied and released, so as to "snub" the brake pressure, for the purpose of preventing a locking of the wheels on slippery roads during the braking process, thus increasing the safety of vehicles which are provided with hydraulic or pneumatic brakes.

Another object of the present invention is the provision of a device of the character described which can be made ineffective manually for driving on dry roads, and which—after it has been made effective—will be made ineffective again automatically when the vehicle travels at such a low speed that there is no danger of sliding even if the wheels should be locked.

Still another object of the present invention is the provision of a device of the character described which can be installed easily and quickly in existing vehicles that are provided with hydraulic or pneumatic brake systems, although it can be built also into newly manufactured vehicles.

A further object of the present invention is the provision of a device of the character described which is comparatively simple in construction, light in weight, small in size and inexpensive to manufacture, but which is also sturdy, durable, reliable and simple in operation, and well adapted for withstanding the rough usage to which devices of this type frequently are subjected.

With the foregoing and other objects in view which will appear as the description proceeds, the invention consists of certain novel details of construction and combinations of parts hereinafter more fully described and pointed out in the claims, it being understood that changes may be made in the construction and arrangement of parts without departing from the spirit of the invention as claimed.

In the accompanying drawing a preferred form of the invention has been shown.

In said drawing:

Figure 1 is a front elevation of a preferred embodiment of my invention;

Figure 2 is a top plan view of the same;

Figure 3 is a reduced side view of the embodiment of Figures 1 and 2 with the operating mechanism attached thereto;

Figure 4 is an enlarged fractional sectional view on the line 4—4 of Figure 6;

Figure 5 is an enlarged sectional view on the line 5—5 of Figure 9;

Figure 6 is an enlarged fractional sectional view as Figure 5 showing various parts of the device in positions different from their positions shown in Figure 5;

Figure 7 is a sectional fractional view on the line 7—7 of Figure 5;

Figure 8 is a sectional fractional view as Figure 7 showing various parts of the device in positions different from their positions shown in Figure 7; and Figure 9 is a sectional view on the line 9—9 of Figure 5.

Similar reference characters refer to similar parts throughout the several views.

In the drawing the numeral 2 denotes a housing of aluminum or of any other suitable material, which has a top closure 4 and a lever 6 at the outer side of the top closure 4. A rod 8 is at one end pivotally connected to the lever 6, and a pipe 10 extending into the upper portion of the housing 2 is connected to a master cylinder (not shown) of a brake system, while a pipe 12 extending into the housing opposite the pipe 10 is connected to the brake lines (not shown) which lead to the brake cylinders at the wheels (not shown) of a vehicle. That end of the rod 8 which is opposite the end connected to the lever 6 is pivotally connected at 14 to a handle 16, which is pivoted at 18 to a part of the vehicle near the driver seat, so that the handle 16 can be operated conveniently by the driver.

A pin 20 laterally extending from the rod 8 engages a slot in one end of a lever 22, which intermediate its ends is pivoted at 24 to a part of the vehicle, and the other end of the lever 22 is provided with pins 26. A shaft 28 is disengageably connected by means of a claw coupling 30 to a shaft 32, and the pins 26 engage an annularly grooved member of the coupling 30. The shaft 32 is detachably connected by means of a governor-controlled clutch 34 to a shaft 38, which extends into the lower portion of the housing 2 and is rotatable therein.

A valve member 40, is rotatable in the upper portion of the housing 2 and provided with a shaft portion that extends through the top closure 4 and has attached to it the lever 6. The main portion of the valve member 40 is diskshaped and has a cross-bore 42 diametrically extended therethrough. A pair of angular bores 44, each of which terminates with one end at the lower side of the member 40 and with the other end at the periphery thereof, are provided in opposite portions of the member 40 and are angularly disposed to the bore 42. A U-shaped channel 46 is provided in the housing 2. The upper ends of the flange portions of the channel 46 terminate beneath the member 40 and register with those ends of the bores 44 which terminate at the lower side of the member 44 when the member 40 is in the position shown in Figure 7. A piston 48 is movable in a cylindrical bore 50 in the housing 2, and a spring 52 interposed between the head of the piston 48 and the upper end of the bore 50 tends to force the piston 48 downwardly into its lowest position (Figure 5). The lower end of the piston 48 is connected by means of a piston pin 54 or the like to a piston rod 56, which at 58 is rotatably connected to a pair of crank arms 60, one of which is secured to the shaft 38. A cross-bore 62 extends through the piston 48 and when the piston 48 is in its lowest position (Figure 5), the bore 62 registers with the web portion of the channel 46. Said web portion preferably is reduced adjacent the cylindrical bore 50, which interrupts the same. The shaft 38 as well as an additional shaft 63 is rotatable in bushings 64 or in any other suitable bearing means in the housing 2.

A cam 66 is secured to the shaft 63 and actuates a second piston 68, which is movable in a second cylindrical bore 70 in the housing 2. The cylindrical bore 70 is connected by a short channel 72 to the bore 46.

The housing 2 preferably consists of a pair of shells, which are joined to each other by means of bolts 74 or the like. A packing 76 preferably is interposed between the upper end of the housing 2 and the outer rim portion of the top closure 4, and the latter is secured to the housing 2 by means of screw threads 78.

The operation of the device is as follows:

The shaft 28 is connected to any suitable driving means, for instance to the drive shaft of a vehicle by means of a flexible shaft in a manner similar to that in which the speedometer is connected to the drive shaft; or the shaft 28 can be driven by any suitable electrical, pneumatic or hydraulic means in such a manner that it rotates at a speed which is changed proportionally in accordance with the traveling speed of the vehicle. The pipe 10 is connected to the master cylinder and the pipe 12 is connected by the brake fluid line to the brake cylinders at the wheels of the vehicle, so that the device is interposed between said brake cylinders and said master cylinder. As long as the lever 16 is in the position shown in Figure 3, the coupling 30 disconnects the shaft 28 from the shaft 32, and the valve member 40 is in the position shown in Figure 8, so that the brake fluid can pass directly from the master cylinder through the pipe 10, the bore 42 and the pipe 12 to the brake cylinders. This is the normal position for driving on dry roads. When driving on a slippery, wet, or icy road surface, the driver moves the lever 16 in a counter-clockwise direction, thereby connecting the shaft 28 to the shaft 32 by means of the coupling 30, and moving the valve member 40 into the position shown in Figure 7 by means of the parts 6 and 8. As long as the vehicle is traveling at a speed of, for instance, ten miles per hour or more, the centrifugal force exerted upon the fly-weights of the governor controlling the clutch 34 cause the latter to connect the shaft 32 to the shaft 38. However, if the speed of the vehicle is reduced to less than ten miles per hour, the resilient arms to which said flyweights are fastened cause said governor controlling the clutch 34 to disconnect the shaft 32 from the shaft 38. While the shafts 28, 32 and 38 are connected to each other, the pistons 48 and 68 are reciprocated in the housing 2 by means of the parts 56, 60 and 66 respectively, so that the pressure of the braking fluid which now can pass only through the bores 44 and the channel 46, is interrupted each time the piston bore 62 is out of registering alignment with the web portion of the channel 46. As may be seen in Figures 5 and 6, the piston 68 is in its lowest position while the piston 48 is in its highest position, which permits expansion of the brake fluid and thus releases the pressure of the same. The movement of the piston 48 causes the same effect as if the driver would oscillate the brake pedal whenever the driver depresses the brake pedal in the ordinary manner. Thus a locking of the wheels on slippery roads is prevented and the safety of driving under adverse road conditions is highly increased.

While in the present instance there have been shown a governor-controlled clutch 34 and a rotating valve member 40, it will be obvious that any other speed-dependent clutch operating means as well as any other valve member could be used.

The purpose of the spring 50 is to move the piston 48 safely into its lowest position if the shaft 38 is disconnected from the shaft 32 by means of the clutch 34.

Since certain changes may be made in the above article and different embodiments of the invention could be made without departing from the scope thereof, it is intended that all matter contained in the above description or shown in the accompanying drawing shall be interpreted as illustrative and not in a limiting sense.

It is also to be understood that the following claims are intended to cover all of the generic and specific features of the invention herein described, and all statements of the scope of the invention which as a matter of language might be said to fall therebetween.

Having thus fully described my said invention, what I claim as new and desire to secure by Letters Patent is:

1. In a hydraulic brake system having a master cylinder and brake cylinders, a device for alternatingly interrupting the brake fluid pressure in brake lines comprising a brake fluid passage, a first brake fluid line connecting one terminal of said passage to the master cylinder, a second brake fluid line connecting the other terminal of said passage to the brake cylinders, an oscillating shut-off member interposed into said brake fluid passage, means for closing said passage and for directly connecting said brake fluid lines to each other, means for actuating said oscillating shut-off member, means for actuating said passage closing and brake fluid line connecting means, and speed-controlled means for connecting said oscillating shut-off member to said means for actuating the shut-off member.

2. In a hydraulic brake system having a master cylinder and brake cylinders, a device for alternatingly interrupting the brake fluid pressure in brake lines comprising a brake fluid passage, a first brake fluid line connecting one terminal of said passage to the master cylinder, a second brake fluid line connecting the other terminal of said passage to the brake cylinders, an oscillating shut-off member interposed into said brake fluid passage, expansion means provided on said brake fluid passage, means for closing said brake passage and for directly connecting said brake fluid lines to each other, means for actuating said oscillating shut-off member and said expansion means, means for actuating said passage closing and brake fluid lines connecting means, and speed-controlled means for connecting said oscillating shut-off member and said expansion means to said means for actuating the shut-off member.

3. A device of the character described comprising a housing having a U-shaped fluid passage which has a web portion and a pair of flange portions and having also a pair of bores the first of which crosses said web portion while the second bore terminates into said web portion, a valve within said housing adapted for temporarily connecting the upper ends of said flange portions to a brake fluid line and for interrupting the same intermediate said flange portions, a first piston movable in said first bore having a cross-bore which in a certain piston position registers with said web portion, a second piston movable in said second bore, means for reciprocating said pistons, a first drive shaft, a speed-controlled clutch connecting said first drive shaft to said means for reciprocating said pistons, a disconnectable coupling connecting said first drive shaft to a second drive shaft, and manually actuated means for simultaneously operating said coupling and said valve.

4. A device for alternatingly interrupting the brake fluid pressure in brake lines comprising a brake fluid line being interrupted at a section thereof, a housing into which terminate the ends of said brake line at said interrupted section having a fluid passage and a pair of bores the first of which crosses said passage while the second bore terminates into said passage intermediate its ends, a valve adapted for connecting in one position the aforementioned brake line ends to each other and in another position for connecting said brake line ends to the ends of said passage, a first piston movable in said first bore having a cross-bore which in the lowest position of said first piston registers with said passage, a second piston movable in said second bore, means for reciprocating said pistons, a first drive shaft, a speed-controlled clutch connecting said first drive shaft to said means for reciprocating said pistons, a disconnectible coupling connecting said first drive shaft to a second drive shaft, and manually actuated means for simultaneously operating said coupling and said valve.

MILTON F. MALONEY.

References Cited in the file of this patent

UNITED STATES PATENTS

| Number | Name | Date |
| --- | --- | --- |
| 2,270,585 | Gartner | Jan. 20, 1942 |
| 2,270,586 | Jahant et al. | Jan. 20, 1942 |